A. Seaman.
Towing.
Nº 18,107.   Patented Sept. 1, 1857.
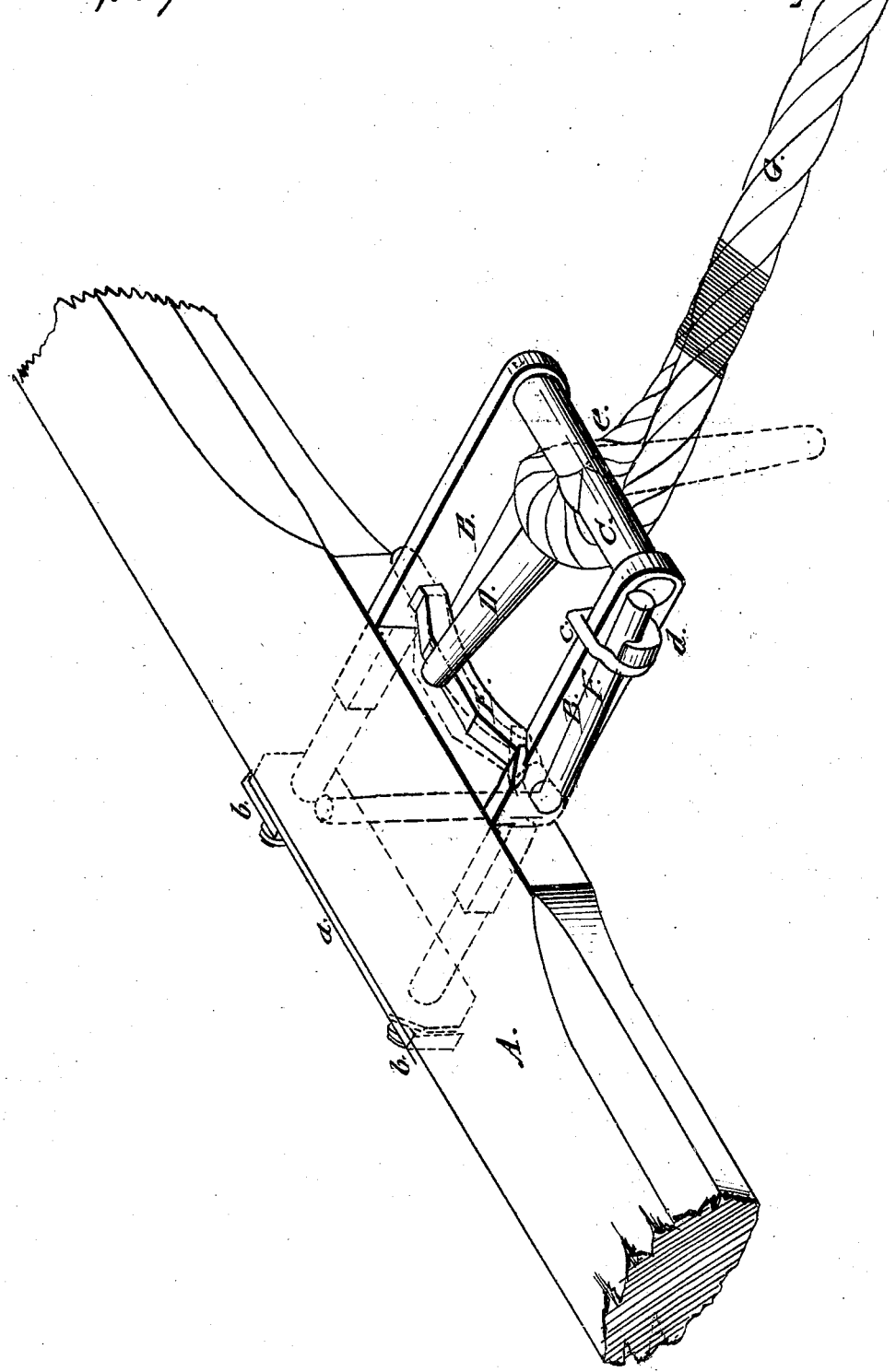

UNITED STATES PATENT OFFICE.

ANDREW SEAMAN, OF AMSTERDAM, NEW YORK.

MEANS FOR ATTACHING WHIFFLETREES TO THE TOW-LINES OF CANAL-BOATS.

Specification of Letters Patent No. 18,107, dated September 1, 1857.

*To all whom it may concern:*

Be it known that I, ANDREW SEAMAN, of Amsterdam, in the county of Montgomery and State of New York, have invented a new and useful Device for Attaching Whiffletrees to the Tow-Lines of Canal-Boats; and I do hereby declare that the following is a full, clear, and exact description of the same, reference being had to the annexed drawing, making a part of this specification, said drawing being a perspective view of my improvement.

This invention has for its object the attaching of whiffle trees to the tow lines of canal boats in such a manner that the whiffle trees may, when necessary, be instantly detached from the tow lines and the horses liberated therefrom so that accidents which now frequently occur to horses by being dragged into the canal in consequence of the impossibility of liberating or detaching them from the tow line will be prevented.

To enable those skilled in the art to fully understand and construct my invention I will proceed to describe it.

A represents a portion of a whiffle-tree to which the horse is attached by traces in the usual manner.

B, B, represent two iron rods which pass transversely through the whiffle-tree at equal distances each side of its center and have thin outer ends connected by a plate (*a*) against which nuts (*b*) on the ends of the rods B press or bear, the nuts being screwed against said plate which bears against the front side of the whiffle-tree. The opposite or back ends of the rods B, B, extend some distance beyond the back side of the whiffle-tree, and their ends are connected by a shaft C the journals of which are allowed to turn in the rods B, B. To the center of the shaft C, a tongue D is attached. This tongue is merely a metal rod of slightly taper form. The outer end of this rod rests or bears upon a curved bar E, the ends of which pass through the rods B, B, and are allowed to turn therein. To one side of the bar E a lever F is attached, said lever when the bow or bend of the bar E is upright as shown in the drawing being by the side of one of the rods B, and secured in that position by a loop (*c*) which is fitted on one of the rods B and through which the lever F passes, said lever resting on a notch (*d*) attached to the rod B adjoining it.

G represents the tow line having an eye or loop (*e*) made at its end. This eye or loop (*e*) is fitted on the tongue D the line passing underneath the shaft C as shown clearly in the drawing.

From the above description of parts it will be seen that the pull of the line will cause the outer end of the tongue D to bear upon the bar E, and in case it is necessary at any time to detach the horse suddenly from the tow line, the attendant moves the loop (*c*) forward and raises the lever F to a vertical position as shown in red, the bend or bow of the bar E will thereby be turned in a horizontal position and free from the end of the tongue D and the tongue will be turned down and around as shown in red and the loop or eye (*e*) of the line G, will of course detach itself from the tongue.

By this device accidents which now frequently occur to horses by being drawn into the canal, in consequence of boats being suddenly stopped and passing boats catching each other's tow lines will be avoided.

The device is simple and the cost of construction and application trifling.

Having thus described my invention what I claim as new and desire to secure by Letters Patent, is,

The shaft C with tongue D attached in combination with the bar E with lever F attached the above parts being fitted to the rods B, B, and the whole arranged substantially as and for the purpose specified.

ANDREW SEAMAN.

Witnesses:
JOSEPH FRENCH,
JOHN A. SPORE.